US012777334B2

(12) United States Patent
Bouthemy et al.

(10) Patent No.: US 12,777,334 B2
(45) Date of Patent: Oct. 27, 2026

(54) NETWORK SLICE-SPECIFIC AUTHENTICATION AND AUTHORIZATION INTEGRATION WITH CLOUD IDENTITY PROVIDERS

(71) Applicant: T-Mobile USA, Inc., Bellevue, WA (US)

(72) Inventors: Jean-Luc Rene Bouthemy, Sammamish, WA (US); Konstantin Gueorguiev Matev, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 102 days.

(21) Appl. No.: 19/006,149

(22) Filed: Dec. 30, 2024

(65) Prior Publication Data

US 2026/0189917 A1 Jul. 2, 2026

(51) Int. Cl.
*H04W 12/71* (2021.01)
*H04W 12/062* (2021.01)
*H04W 12/08* (2021.01)

(52) U.S. Cl.
CPC ......... *H04W 12/71* (2021.01); *H04W 12/062* (2021.01); *H04W 12/08* (2013.01)

(58) Field of Classification Search
CPC .... H04W 12/71; H04W 12/062; H04W 12/08
See application file for complete search history.

(56) References Cited

U.S. PATENT DOCUMENTS 9,544,287 B1 1/2017 Sokolov et al.
9,717,003 B2 7/2017 Lee et al.
(Continued)

FOREIGN PATENT DOCUMENTS

CN 106713406 A 5/2017
CN 108810004 B 8/2020
(Continued)

OTHER PUBLICATIONS

Fernandez, G. et al., "OpenID Connect Client-Initiated Backchannel Authentication Flow—Core 1.0," OpenID Foundation, Sep. 1, 2021, pp. 1-25.

*Primary Examiner* — Javier O Guzman
(74) *Attorney, Agent, or Firm* — Ashurst Perkins Coie US LLP

(57) ABSTRACT

A computer system implements network slice-specific authentication and authorization by integrating cloud identity providers with 5G network slices. After a user equipment completes primary authentication using subscription credentials, the system determines whether additional slice-specific authentication is required for network slices. Through a Network Slice-Specific Authentication and Authorization Function (NSSAAF), the system selects an appropriate cloud identity provider based on both the slice identifier and subscription identifier. The system establishes a backchannel authentication session with the selected provider and provisions a default network slice specifically for handling authentication traffic. This enables out-of-band multi-factor authentication between the user equipment and provider through various notification methods. Upon successful authentication, the system receives an access token and enables access to both the network slice and its associated services such as edge computing and software-defined networking. The system supports multiple authentication modes, revocation capabilities, and can maintain multiple simultaneous network slices with different security requirements.

20 Claims, 6 Drawing Sheets

(56) References Cited

U.S. PATENT DOCUMENTS

| | | | |
|---|---|---|---|
| 10,491,376 B1 | 11/2019 | Suthar et al. | |
| 10,595,187 B2 | 3/2020 | Tandon et al. | |
| 10,749,868 B2 | 8/2020 | Appiah et al. | |
| 10,972,385 B2 | 4/2021 | Cui et al. | |
| 11,019,077 B2 | 5/2021 | Verma et al. | |
| 11,510,139 B2 | 11/2022 | Tamura et al. | |
| 11,539,699 B2 | 12/2022 | Kunz et al. | |
| 11,553,408 B2 | 1/2023 | Surisetty et al. | |
| 11,553,463 B2 | 1/2023 | Panchal et al. | |
| 11,683,682 B2 | 6/2023 | Faccin | |
| 11,689,367 B2 | 6/2023 | Ying et al. | |
| 11,711,401 B2 | 7/2023 | Solari et al. | |
| 11,758,459 B2 | 9/2023 | Goel et al. | |
| 11,910,299 B2 | 2/2024 | Gundavelli et al. | |
| 12,133,072 B2 | 10/2024 | Kuge | |
| 12,143,813 B2 * | 11/2024 | Taft | H04L 63/0892 |
| 2014/0237545 A1 | 8/2014 | Mylavarapu et al. | |
| 2017/0164212 A1 * | 6/2017 | Opsenica | G06F 16/41 |
| 2017/0289791 A1 | 10/2017 | Yoo et al. | |
| 2020/0280854 A1 * | 9/2020 | Kunz | H04W 12/0431 |
| 2021/0029046 A1 | 1/2021 | Mas Rosique et al. | |
| 2021/0243600 A1 | 8/2021 | Yu | |
| 2022/0124486 A1 | 4/2022 | Andrews et al. | |
| 2022/0240174 A1 * | 7/2022 | Kim | H04W 4/50 |
| 2022/0248497 A1 | 8/2022 | Tamura et al. | |
| 2022/0286953 A1 | 9/2022 | Long | |
| 2022/0311626 A1 * | 9/2022 | Gundavelli | H04L 9/0894 |
| 2022/0330022 A1 * | 10/2022 | Kolekar | H04W 12/069 |
| 2023/0048066 A1 * | 2/2023 | Lei | H04L 41/0806 |
| 2023/0087650 A1 | 3/2023 | Watfa et al. | |
| 2023/0137359 A1 | 5/2023 | Van Den Dungen et al. | |
| 2023/0269136 A1 | 8/2023 | Gupta et al. | |
| 2023/0269589 A1 | 8/2023 | Baskaran et al. | |
| 2023/0336985 A1 | 10/2023 | Zisimopoulos et al. | |
| 2023/0379704 A1 * | 11/2023 | Li | H04W 12/08 |
| 2023/0388792 A1 | 11/2023 | Srivastava et al. | |
| 2023/0413360 A1 | 12/2023 | Velev et al. | |
| 2024/0022906 A1 | 1/2024 | So | |
| 2024/0031798 A1 * | 1/2024 | Zhu | H04L 63/0892 |
| 2024/0064827 A1 | 2/2024 | Lataste et al. | |
| 2024/0137761 A1 * | 4/2024 | Wang | H04W 12/06 |
| 2024/0147235 A1 | 5/2024 | Velev | |
| 2024/0196355 A1 | 6/2024 | Cao et al. | |
| 2024/0223447 A1 | 7/2024 | Vemuri et al. | |
| 2024/0223548 A1 * | 7/2024 | Xu | H04L 63/08 |
| 2024/0283825 A1 * | 8/2024 | Balmakhtar | H04L 63/20 |
| 2024/0284174 A1 * | 8/2024 | Li | H04W 12/72 |
| 2026/0122552 A1 * | 4/2026 | Lei | H04W 48/02 |

FOREIGN PATENT DOCUMENTS

| | | | |
|---|---|---|---|
| CN | 113194519 | B | 5/2022 |
| CN | 113596831 | B | 12/2022 |
| CN | 113286300 | B | 1/2023 |
| CN | 115004741 | B | 9/2023 |
| CN | 114980262 | B | 3/2024 |
| EP | 1872188 | A2 | 1/2008 |
| EP | 2016544 | A1 | 1/2009 |
| EP | 3777011 | A1 | 2/2021 |
| EP | 3794857 | A1 | 3/2021 |
| EP | 2016543 | B1 | 5/2021 |
| WO | 2019191267 | A1 | 10/2019 |
| WO | 2021004444 | A1 | 1/2021 |
| WO | 2021134364 | A1 | 7/2021 |
| WO | 2021247725 | A1 | 12/2021 |

* cited by examiner

NETWORK SLICE-SPECIFIC AUTHENTICATION AND AUTHORIZATION INTEGRATION WITH CLOUD IDENTITY PROVIDERS

BACKGROUND

Network slicing is a key feature of 5G systems that enables network operators to provide customized networks with different functionalities for diverse services and user groups with specific service requirements. These network slices allow operators to partition their network infrastructure into distinct virtual networks, each designed for particular service requirements. Authentication and authorization in 5G networks involves multiple components and protocols. The primary authentication (i.e., 5G-AKA or EAP-AKA') occurs when a User Equipment (UE) connects to the network, using subscription credentials stored in the UE. Network Slice-Specific Authentication and Authorization (NSSAA) provides an additional layer of authentication that can be performed after the primary authentication, allowing for slice-specific access control. Authentication systems commonly employ various security mechanisms, including Single Sign-On (SSO), Multi-Factor Authentication (MFA), and integration with cloud-based identity providers. These systems typically utilize standardized protocols such as OAuth 2.0 and OpenID Connect for secure authentication and authorization. The technical implementation of network slice authentication involves multiple network functions within the 5G core network architecture, including the Access and Mobility Function (AMF) and the Network Slice-Specific Authentication and Authorization Function (NSSAAF).

However, previous approaches to network slice authentication rely on Authentication Authorization and Accounting (AAA) servers, often requiring customers to deploy and manage their own on-premises infrastructure. Companies typically no longer maintain their own servers, having moved to cloud or cloud-native solutions. Conventional approaches assume that operators would manage all credentials, creating potential security concerns. Moreover, implementation of conventional approaches can require complex infrastructure including IPsec gateways and AAA servers at customer premises. As a result, cross-domain management can be particularly problematic.

BRIEF DESCRIPTION OF THE DRAWINGS

Detailed descriptions of implementations of the present technology will be described and explained through the use of the accompanying drawings.

Figure 1:
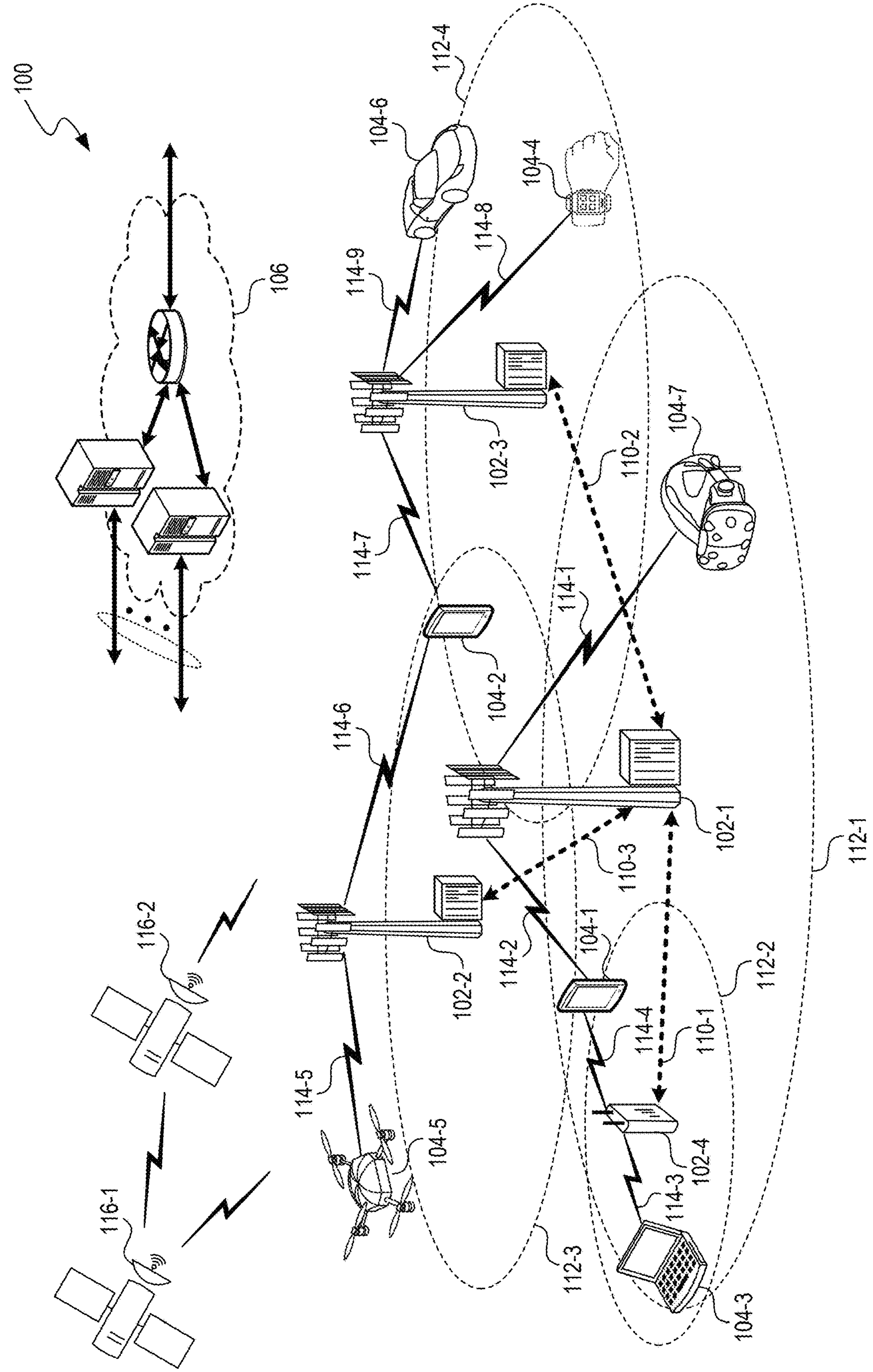
FIG. 1 is a block diagram that illustrates an example radio access network (RAN) of a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION 5G network slicing technology enables operators to provide customized networks with different functionalities for diverse services and user groups with specific service requirements. Network slices allow operators to partition their network infrastructure into distinct virtual networks, each optimized for particular service requirements and controlled through Network Slice-Specific Authentication and Authorization (NSSAA). However, previous approaches to network slice authentication rely on Authentication Authorization and Accounting (AAA) servers, often requiring customers to deploy and manage their own on-premises infrastructure. Companies typically no longer maintain their own servers, having moved to cloud or cloud-native solutions. Conventional approaches assume that operators would manage all credentials, creating potential security concerns. Moreover, implementation of conventional approaches can require complex infrastructure including IPsec gateways and AAA servers at customer premises. As a result, cross-domain management can be particularly problematic.

This document discloses methods, systems, and apparatuses to integrate cloud identity providers with NSSAA while reducing changes to existing 5G infrastructure. The disclosed methods modify the Network Slice-Specific Authentication and Authorization Function (NSSAAF) and implement Client Initiated Backchannel Authentication (CIBA) between NSSAAF and identity providers. The systems disclosed use a default network slice to handle authentication traffic and enable identity provider selection per network slice/subscription. The authentication flow involves NSSAAF subscribing to Unified Data Management (UDM) for notification of successful primary authentication and supports out-of-band authentication between UEs and identity providers. The disclosed systems can be triggered via multiple mechanisms such as SMS or Push Notification, and provide three authentication modes: ping, push, and pull. The disclosed solutions remove operator access to third-party credentials, support modern Multi-Factor Authentication methods, enable Single Sign-On for slice-level access and related services, and maintain separation between primary and secondary authentication.

In some implementations, a computer system processes network slice authentication requests for UEs after primary network authentication is completed using subscription credentials. Upon determining that slice-specific authentication is required, the system selects an appropriate cloud identity provider based on both the allowed network slice identifier and the subscription identifier associated with a UE. Using the NSSAAF, the system initiates a backchannel authorization request to the selected provider and receives an authentication request identifier. The system provisions a default network slice specifically for handling the authentication traffic between the UE and identity provider. This enables an out-of-band authentication process that, upon successful multi-factor authentication, results in an access token from the provider. Based on this token, the system enables access to both the allowed network slice and its associated slice-specific services for the authenticated UE.

In some instances, a computer system receives a notification that a UE has completed primary authentication using its subscription credentials. The system determines whether slice-specific authentication is required for the UE's allowed network slice and establishes a client-initiated backchannel authentication session with a cloud identity provider selected based on the slice. After receiving an authentication request identifier from the provider, the system triggers an out-of-band authentication process between the UE and identity provider using a default network slice configured specifically for authentication traffic. The system monitors for receipt of the authentication result from the cloud identity provider through one of three supported modes: poll, ping, or push. Based on the received authentication result, the system configures appropriate network slice access permissions for the UE.

In some instances, the computer system leverages the NSSAAF to enable secure slice access through cloud identity providers. For example, the NSSAAF receives notification that a UE has completed primary authentication with the network using its subscription credentials. After determining that network slice-specific authentication is required for the UE's slice, the system establishes a backchannel authentication session with a cloud identity provider that is selected based on both the slice and the subscription identifier associated with the UE. The system configures a default network slice specifically for handling authentication traffic between the UE and selected provider. This enables triggering of an out-of-band multi-factor authentication process between the UE and provider. Upon receiving an authentication result indicating successful completion, the system enables access to both the allowed network slice and its associated slice-specific services.

The benefits and advantages of the implementations described herein include modernizing network slice authentication while maintaining compatibility with existing 5G infrastructure. By integrating cloud identity providers with NSSAA, the solution avoids the need for customers to maintain complex on-premises infrastructure such as RADIUS servers and IPsec gateways, significantly reducing deployment complexity and operational overhead. The approaches disclosed enhance security by removing operator access to third-party credentials while enabling modern authentication capabilities including Multi-Factor Authentication and Single Sign-On for both slice-level access and related services such as edge computing and SD-WAN. The flexible architecture disclosed supports multiple authentication modes and triggering mechanisms while requiring minimal changes to existing infrastructure—by modifying the NSSAAF component. The disclosed methods facilitate Network as a Service initiatives and enable integration with enterprise identity systems and cloud providers. The solutions also address practical operational challenges by providing mechanisms for access revocation and timing management between primary and secondary authentication processes.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be located at a cell site. A base station can includes the following components: Transceiver(s) (a component that both transmits and receives RF signals, antenna(s) to transmit and receive signals, and a Baseband processing unit that processes the signals received from the transceiver(s). The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Figure 2:
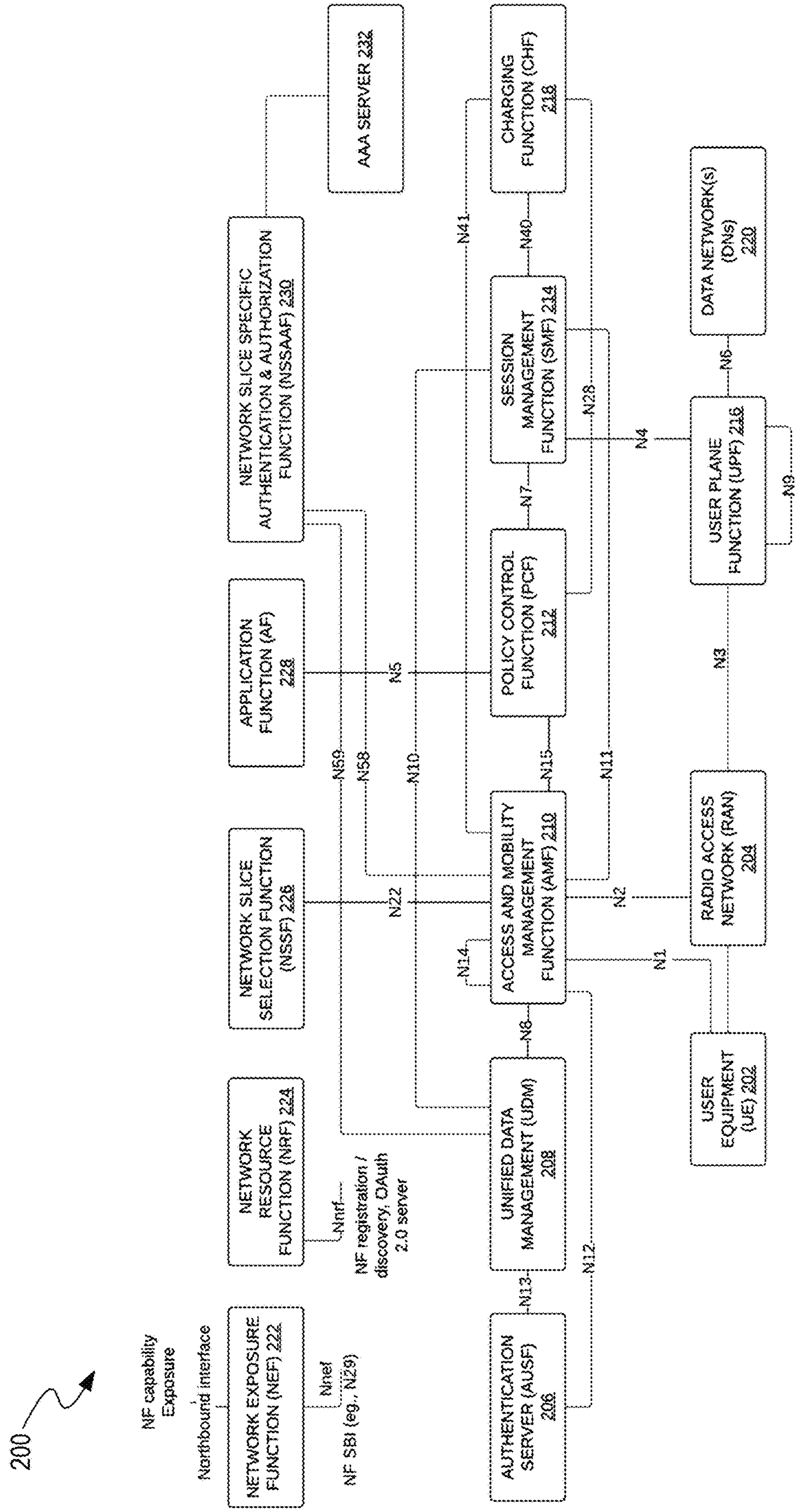
FIG. 2 is a block diagram that illustrates an architecture including selected 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs shown by FIG. 2 include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, a Charging Function (CHF) 218, a Network Exposure (NEF) 222, a Network Resource Function (NRF) 224, a Network Slice Selection Function (NSSF) 226, an Application Function (AF) 228, and a Network Slice-Specific Authentication & Authorization Function (NSSAAF) 230. There can be more than one AUSF, AMF, etc., in a production network.

The N interfaces define communications and/or protocols between each NF as described in relevant standards. The UPF 216 is part of the user plane and the other Network Functions (e.g., AMF 210, SMF 214, PCF 212, AUSF 206, and UDM 208) are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA also includes Network Exposure Functions (NEFs) 222, Network Repository Functions (NRFs) 224, Network Slice Selection Functions (NSSFs) 226, and other functions such as Service Communication Proxies (SCPs). Several other interfaces include N16 AMF-SMSF (Short Message Service Function), N17 AMF-NSSF (Network Slice Selection Function), N18 NSSF-NSSF, N19 PCF-NEF (Network Exposure Function), N20 NEF-AF, N21 PCF-CHF (Charging Function), etc. Further details are available at TS 23.501 Chapter 4.2.7 Reference Points.

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services. The NRF 224 also acts as an OAuth 2.0 server within the SBA.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Cloud Identity Provider Network Slice Authentication

Figure 3A:
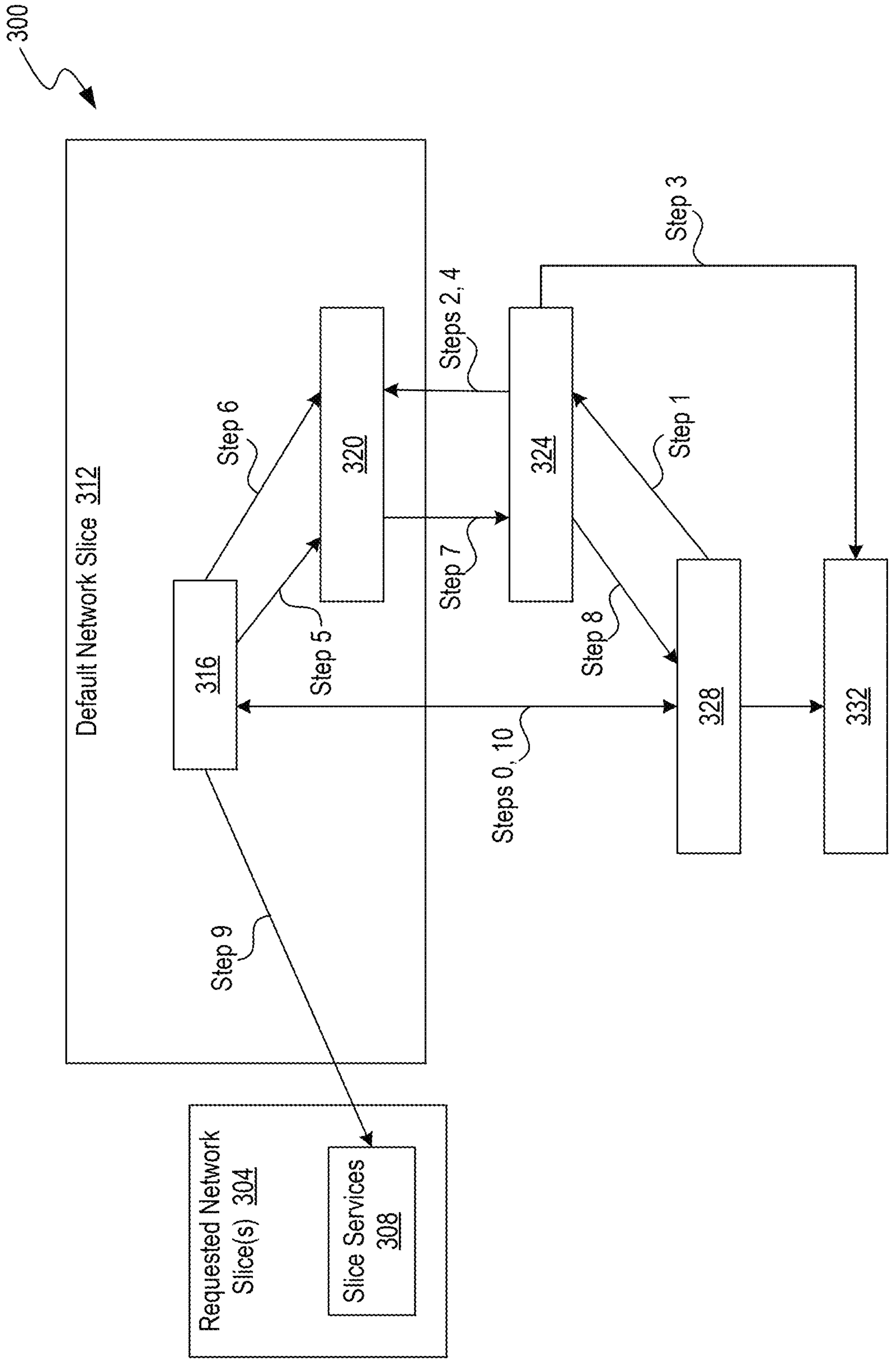
FIG. 3A is a block diagram that illustrates an example system for network slice-specific authentication and authorization integration with cloud identity providers.

FIG. 3 is a block diagram that illustrates an example system 300 for network slice-specific authentication and authorization integration with cloud identity providers. System 300 includes a UE 316 (which the user has a subscription for including an allowed default network slice 312, which does not require authentication per slice and other network slices, some of them may require authentication per slice). In this description, the allowed network slice 304 requires authentication per slice. The system 300 includes a cloud identity provider 320, an NSSAAF 324, an AMF 328, and a UDM 332. The AMF 328, and UDM 332 are the same as or similar to the AMF 210 and the UDM 208 illustrated and described in more detail with reference to FIG. 2, respectively. Likewise, embodiments of example system 300 can include different and/or additional components or can be connected in different ways.

The system 300 implements network slice-specific authentication and authorization (NSAA) using the interconnected components shown by FIG. 3 that work together to enable secure access to network slices (e.g., allowed network slice(s) 304) and their associated services (e.g., slice services 308). Network slicing is a key feature in 5G networks that allow operators to provide customized networks with different functionalities for diverse services or specific user groups with unique service requirements. Network slicing creates an end-to-end abstraction from the UE 316 through the radio network to business logic and services, similar to how cloud providers provide virtual machines with isolated resources. Network slicing enables operators to expose resources to third parties for self-management, effectively turning the mobile operator into a cloud provider. In some implementations, the UE 316 can access up to 8 different slices simultaneously, each potentially configured with different characteristics such as low latency or high reliability to serve various use cases such as government services, enterprise applications, or IoT devices. In this submission, at least one allowed network slice requires authentication per slice.

At the core of the system 300 is the NSSAAF 324, which serves as the central coordination point for managing slice authentication processes. The NSSAAF 324 is a dedicated network function in 5G core networks that handles secondary authentication for network slices after primary authentication is completed. According to 3GPP specifications (in particular, 3GPP TS 23.501 and 3GPP TS 29.526 latest release—3GPP release 18), the NSSAAF 324 acts as an intermediary between the AMF 328 and AAA servers, processing EAP-based authentication requests. In the disclosed implementations, the NSSAAF 324 is enhanced to integrate with the cloud identity provider 320, enabling the NSSAAF 324 to establish backchannel authentication sessions and handle out-of-band multi-factor authentication processes. The NSSAAF 324 selects appropriate identity providers based on network slice and subscription identifiers, manages authentication traffic through the default network slice 312, and processes authentication results to enable slice access to the allowed network slice 304. Allowed slices refer to those allowed by the network and may be accessed after further authentication, such as authentication per slice. The UE 316 sends a list of network slices. These can be overwritten by the network. These slices are those allowed for the UE 316.

The UE 316 is any device capable of connecting to the mobile network including phones, tablets, IoT devices, or virtual machines. The UE 316 contains subscription credentials stored in a Subscriber Identification Module (SIM) that are used for primary authentication with the network. In some implementations, the UE 316 is the same as or similar to the wireless devices 104-1 through 104-7 illustrated and described in more detail with reference to FIG. 1. The primary authentication occurs through the AMF 328 component, which validates the subscription credentials and establishes basic network connectivity through a mutual challenge process between the UE 316 and the network (e.g., network 100 shown by FIG. 1). For example, Step 0 represents a primary authentication (AKA) exchange, which involves NFs such as AMF, UDM, AUSF. Step 0 can require services from NRF, SCP, NWDAF, NSACF, and NSSF, and is triggered by a Registration Request sent by the UE 316 to the AMF 328.

The AMF 328 works in conjunction with the UDM 332 to evaluate whether additional slice-specific authentication is required for network slices requested by the UE 316. The determination is made by analyzing the slice identifier (S-NSSAI) of the allowed network slices (including network slice 312 and 304) and associated subscription information stored locally or retrieved from the UDM 332. Different network slices may have varying security requirements based on their intended use cases, with some slices designated for sensitive operations such as government use requiring mandatory slice-specific authentication. For example, Step 1 is a network slice authentication/authorization trigger.

When slice-specific authentication is required, the NSSAAF 324 component initiates interaction with cloud identity providers (e.g., cloud identity provider 320). For example, in Step 2 a cloud identity provider is identified, e.g., based on subscription information (e.g., using NSSAI and SUPI). The system 300 maintains a mapping between network slices and corresponding identity providers, enabling selection of the appropriate provider based on both the allowed network slice identifier and the subscription identifier (SUPI) associated with the UE 316. Other parameters may be retrieved such as MSISDN. This dual-factor selection process ensures proper security boundaries are maintained while enabling integration with modern authentication services. For example, in Step 3 the NSSAAF queries the UDM to get subscription (e.g., IMEI, MSISDN).

In some implementations, the system 300 implements a dedicated default network slice 312 specifically configured to handle authentication traffic between the UE 316 and selected cloud identity provider 320. This default slice 312 creates an isolated communication channel that ensures secure transmission of authentication data while preventing interference with other network operations. The default slice 312 supports multiple authentication modes including poll mode where the system 300 periodically checks for results, ping mode where it waits for notification before requesting results, or push mode where results are received directly from the cloud identity provider 320.

To facilitate modern authentication methods, the system 300 leverages Client Initiated Backchannel Authentication (CIBA) to establish secure server-to-server communication between the NSSAAF 324 and cloud identity provider 320 without requiring browser redirects or user agent involvement. For example, Step 4 is a CIBA request. CIBA is an extension to OpenID Connect that enables direct server-to-server communication between a client application and authentication server without browser redirects or user agent involvement. CIBA supports authentication flows where the client application and authentication server are on separate devices, allowing decoupled authentication processes. The backchannel implemented by the disclosed embodiments herein enables out-of-band multi-factor authentication processes that can be triggered through various channels including SMS messages, push notifications, or dedicated application notifications sent to the UE 316. For example, Step 7 represents a CIBA push callback or CIBA polling request/CIBA polling response.

The authentication process supports multiple factors across different categories: a possession of a user (such as a phone), knowledge of the user (such as a password), and characteristics of the user (such as biometric data). This allows the system 300 to implement strong security measures while maintaining flexibility in authentication methods. The multi-factor capabilities enable modern security approaches such as facial recognition, iris scanning, or one-time passwords to be used in conjunction with standard credentials.

When authentication is completed, the cloud identity provider 320 returns results to the NSSAAF 324 through the established backchannel session. For example, in Step 5 the cloud identity provider notification is sent on default slice. Successful authentication is indicated by an access token or success indicator transmitted over the default network slice 312. Upon receiving successful authentication results, the system 300 coordinates the activation of network slice access and associated services (e.g., slice services 308) through a comprehensive configuration process. For example, Step 6 represents Over the Top authentication between UE (User) and cloud identity provider (user interaction).

The service enablement extends beyond basic slice connectivity to include single sign-on access to related services such as edge computing and software-defined wide area network capabilities specifically associated with the authenticated slice. The system 300 maintains proper security boundaries and access controls while enabling seamless access to both network slice resources and additional slice-specific services. While performing the authentication and authorization process, the system 300 maintains separation between different types of network traffic. For example, authentication data is isolated within the default network slice 312, while operational traffic for activated services uses the specifically allowed network slice 304. This traffic separation, combined with the secure backchannel communication and multi-factor authentication support, creates a robust security framework for controlling access to the allowed network slice 304 and its associated services—slice services 308. For example, in Step 10 the AMF notifies the UE if the registration was successful.

The system 300 also supports authentication session management and revocation capabilities. When access needs to be removed, such as when an employee leaves an organization, the system 300 can process revocation requests to update slice-specific authentication configurations and terminate active authentication sessions. This functionality ensures that access controls remain current and aligned with organizational security requirements.

The NSSAAF component 324 maintains active subscriptions to receive notifications about primary authentication completions and other relevant network events. This notification system enables efficient coordination between primary network authentication and secondary slice-level authentication procedures, ensuring proper sequencing of security processes. The subscription mechanism also allows the system 300 to track the status of authentication sessions and respond appropriately to changes in network conditions or security requirements. For example, Step 8 represents the network slice authentication status (e.g., "200 OK SliceAuthConfirmationResponse" or "4xx/5xx ProblemDetails"). Integration with the cloud identity provider 320 enables the system 300 to leverage modern authentication infrastructures while reducing the need for organizations to maintain separate authentication servers.

The disclosed approach avoids the need for organizations to deploy and manage traditional RADIUS servers or other on-premises authentication infrastructure, instead allowing them to use their existing cloud-based identity management solutions. A RADIUS (Remote Authentication Dial-In User Service) server is a legacy authentication technology used in mobile networks for handling user authentication and authorization requests. In the context of 5G network slicing, RADIUS servers were traditionally used for secondary authentication, but they present limitations for modern cloud-based implementations. The technology is commonly used within operator networks but becomes problematic when managing cross-domain authentication.

In implementations, the system 300 architecture supports multiple simultaneous network slices, allowing the UE 316 to access up to eight different slices with varying authentication requirements. For example, Step 9 represents that the UE 316 can access slices services for allowed network slices. Each slice can be configured with different service characteristics such as low latency or high reliability, and the authentication requirements can be tailored to match the security needs of the specific use case. By implementing the disclosed authentication and authorization framework, the system 300 enables secure and flexible access to network slices while supporting modern authentication methods and maintaining proper security isolation. The integration with the cloud identity provider 320 and support for multi-factor authentication provides that organizations can implement security controls without requiring complex on-premises infrastructure.

Figure 3B:
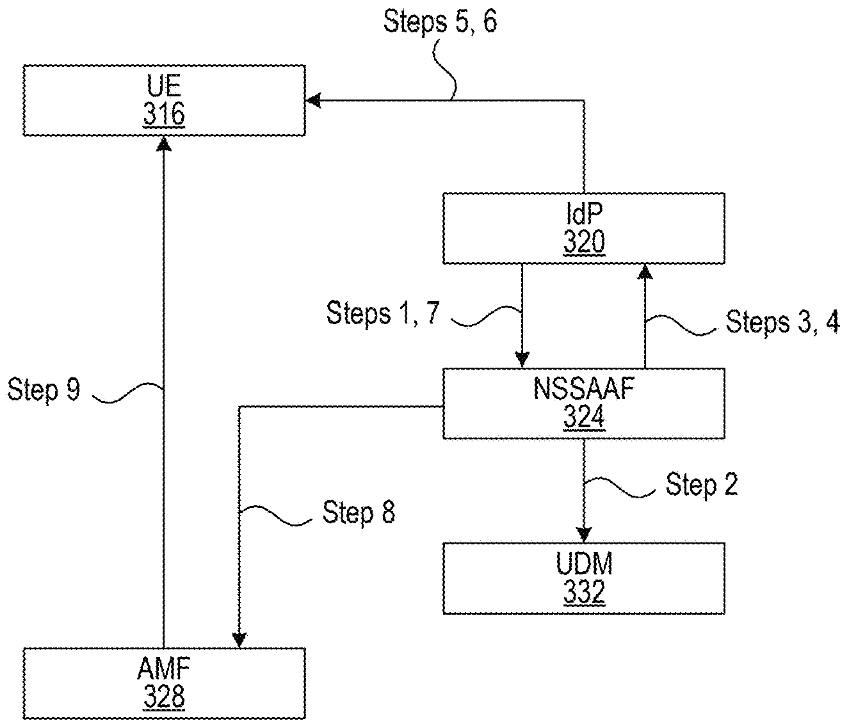
FIG. 3B is a flow diagram that illustrates an example process for re-authentication notification.

FIG. 3B is a flow diagram that illustrates an example process for re-authentication notification. The process illustrated by FIG. 3B relates to re-authentication performed either at access token expiration or at the request of the cloud identity providers 320. FIG. 3B describes the scenario when re-authentication is required for a network slice. Previously, access was granted at the network slice level. In some implementations, the process is performed by the system 300 illustrated and described in more detail with reference to FIG. 3. In some implementations, the process is performed by a computer system, e.g., example computer system 500 illustrated and described in more detail with reference to FIG. 5. Likewise, implementations can include different and/or additional steps or can perform the steps in different orders.

The re-authentication flow for network slice access shown by FIG. 3B involves multiple system components interacting in a specific sequence. In some implementations, the system receives, by NSSAAF 324, a re-authentication notification for access by UE 316 to a network slice. In step 1, the identity provider (IdP 320) sends a notification or CIBA polling request/response to the NSSAAF 324. The UDM 332 is queried to obtain subscription information associated with the UE 316. In Step 2, upon receiving this trigger, the NSSAAF 324 queries the UDM 332 to obtain subscription information associated with the UE 316. In Step 3, based on the subscription information and network slice details, the NSSAAF 324 identifies the appropriate cloud identity provider 320.

In Step 4, the NSSAAF 324 then transmits a CIBA request to the selected identity provider and receives a response containing authentication parameters. The system facilitates out-of-band authentication between the UE 316 and the cloud identity provider 320 by sending an identity provider notification using a default network slice (Step 5). This enables direct communication between the UE 316 and IdP 320 while avoiding browser redirects. During this phase, in Step 6 the UE 316 and identity provider 320 perform over-the-top authentication, which may involve user interaction for multi-factor authentication.

The cloud identity provider 320 communicates the authentication result back to the NSSAAF 324 through a CIBA push callback or through polling mechanisms. For example, Step 7 represents a CIBA push callback or CIBA polling request/CIBA polling response. The NSSAAF 324 then transmits the authentication status to the access and mobility function 328. In Step 8, the authentication status can be either a success response (e.g., 200 OK SliceAuthConfirmationResponse) or a problem details response indicating authentication failure (e.g., 4xx/5xx ProblemDetails).

Upon receiving the authentication status, the AMF 328 stores the NSSAA result for the related S-NSSAI in the UE context and notifies the UE 316 of the authentication outcome (Step 9). This stored status determines the user equipment's continued access to the network slice and associated services. Receiving the authentication status includes implementing at least one of a poll mode that periodically requests the authentication status, a ping mode that waits for notification before requesting the authentication status, or a push mode that receives the authentication status directly. In some implementations, receiving the re-authentication notification includes receiving a message that an access token associated with the network slice has expired, or receiving a request from the cloud identity provider 320 to re-authenticate the access of the UE 316.

Figure 3C:
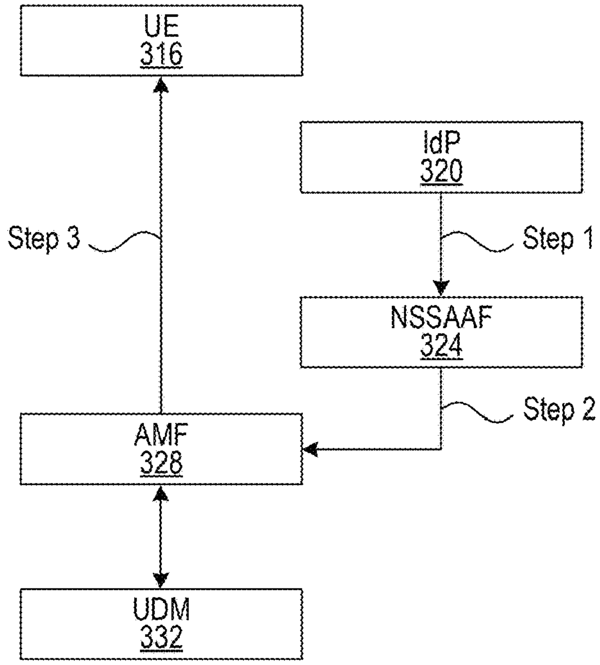
FIG. 3C is a flow diagram that illustrates an example process for revocation notification.

FIG. 3C is a flow diagram that illustrates an example process for revocation notification. The process illustrated by FIG. 3B relates to revocation of the access for a specific network. FIG. 3C describes the scenario when the access to a network slice is revoked. Previously, access was granted at the network slice level. In some implementations, the process is performed by the system 300 illustrated and described in more detail with reference to FIG. 3. In some implementations, the process is performed by a computer system, e.g., example computer system 500 illustrated and described in more detail with reference to FIG. 5. Likewise, implementations can include different and/or additional steps or can perform the steps in different orders.

The revocation flow for network slice access shown by FIG. 3C involves interaction between multiple system components. In Step 1, the Identity Provider (IdP) 320 sends a notification or CIBA polling request/response to the NSSAAF 324, indicating that access to a network slice should be revoked. At Step 2, upon receiving this revocation trigger, the NSSAAF 324 transmits a callback notification, specifically a Re-Authentication Notification to the AMF 328. This callback notification prompts the AMF 328 to update the NSSAA result status for the related S-NSSAI in the user equipment context, effectively marking the slice access as revoked.

In some implementations, updating the network slice access configurations includes storing the authentication status for the network slice in a user equipment context maintained by the AMF 328. The UE 316 is notified of changes to network slice availability based on the stored authentication status. At Step 3, after updating the stored authentication status, the AMF 328 sends a notification to the UE 327 informing it that the network slice is no longer available. This notification ensures the UE 316 is aware of the access revocation and can adjust its operations accordingly. The revocation flow supports various scenarios where access needs to be terminated, such as when an access token associated with the network slice has expired or when the cloud identity provider explicitly requests re-authentication of the user equipment's access. Throughout this process, the system maintains proper security boundaries while ensuring prompt and complete removal of access to both the network slice and its associated services. This revocation mechanism is particularly important for scenarios such as when employees change roles or leave organizations, requiring immediate termination of their access to specific network slices and associated services. The flow ensures that all necessary components are updated to reflect the access revocation, maintaining the security and integrity of the network slice architecture.

Figure 4:
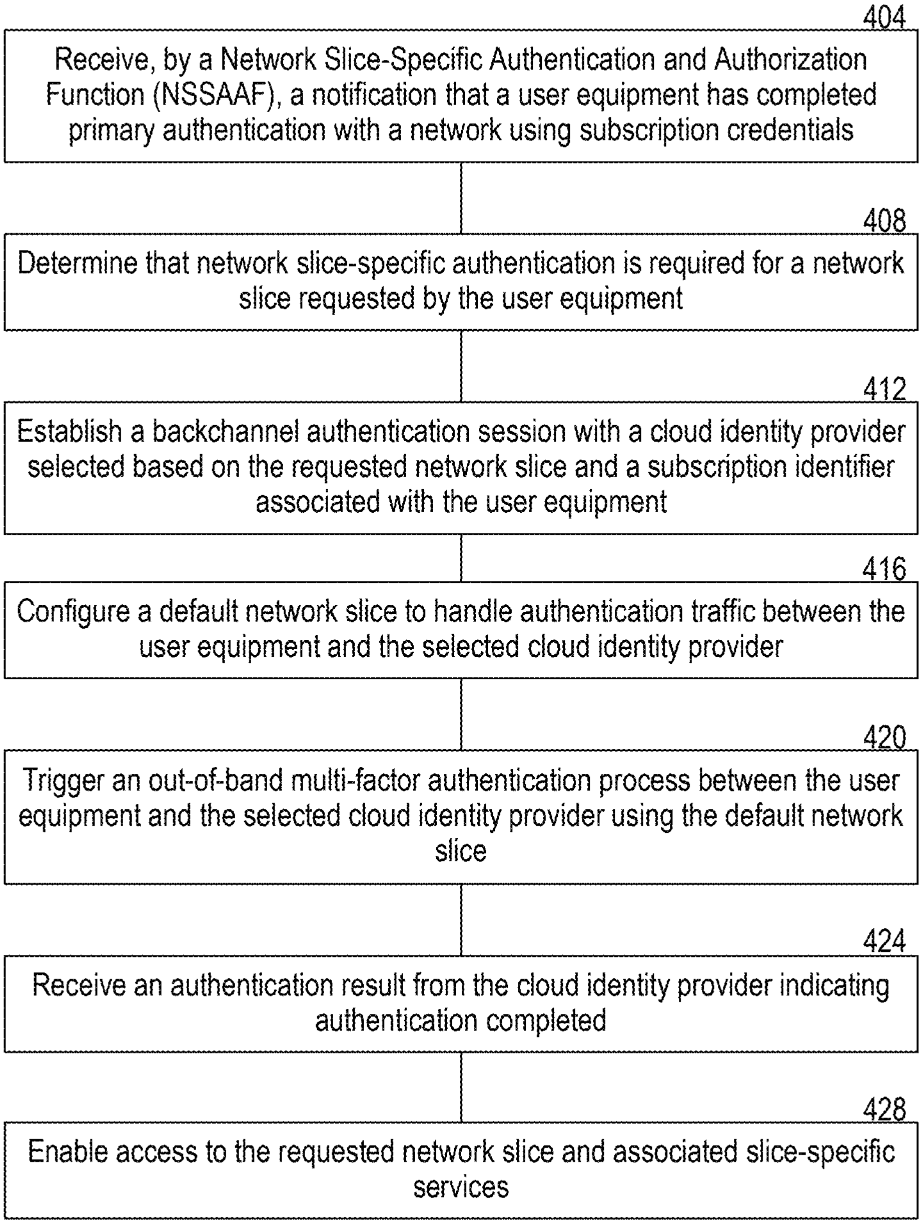
FIG. 4 is a flowchart that illustrates an example process for network slice-specific authentication and authorization integration with cloud identity providers.

FIG. 4 is a flowchart that illustrates an example process for telecommunication over next-generation telecommunication networks. In some implementations, the process is performed by the system 300 illustrated and described in more detail with reference to FIG. 3. In some implementations, the process is performed by a computer system, e.g., example computer system 500 illustrated and described in more detail with reference to FIG. 5. Likewise, implementations can include different and/or additional steps or can perform the steps in different orders.

At 404, a computer system implements a notification mechanism whereby an NSSAAF receives an indication that a UE has successfully completed its primary authentication phase with the network. An example NSSAAF 324 and UE 316 are shown by FIG. 3. The primary authentication utilizes the UE's subscription credentials stored in the Subscriber Identification Module (SIM) to establish basic network connectivity through a mutual challenge process between the UE 316 and network. The notification is received after the AMF has validated the subscription credentials and determined that additional slice-specific authentication may be required for the UE's allowed network slices. An example AMF 326 is shown by FIG. 3. The NSSAAF maintains an active subscription to receive the primary authentication completion notifications, allowing the NSSAAF to efficiently coordinate the timing and sequencing of any subsequent slice-specific authentication processes. The notification serves as the trigger point for initiating the slice-specific authentication workflow, ensuring proper sequencing between primary network authentication and secondary slice-level authentication procedures.

At 408, upon receiving notification of primary authentication completion, the computer system performs a determination process to evaluate whether network slice-specific authentication is needed for the particular network slice requested by the UE. An example allowed network slice 304 is shown by FIG. 3. The determination is made by the AMF based on slice configurations and information stored locally or retrieved from the UDM 332. The computer system analyzes the network slice identifier (S-NSSAI) and associated subscription information to assess whether additional authentication requirements are configured for that specific slice. This determination step is used for enforcing proper access controls, as different network slices may have varying security requirements based on their intended use cases and sensitivity levels. For example, slices designated for government use or containing sensitive enterprise services may require slice-specific authentication, while other slices may operate with primary authentication alone. The outcome of this determination process directs whether the computer system proceeds with initiating the slice-specific authentication workflow through the cloud identity provider integration. An example cloud identity provider 320 is shown by FIG. 3.

At 412, the computer system establishes a secure back-channel authentication session by having the NSSAAF (e.g., NSSAAF 324 shown by FIG. 3) initiate a connection with a selected cloud identity provider (e.g., cloud identity provider 320 shown by FIG. 3). The provider selection process utilizes both the network slice identifier (S-NSSAI) and the subscription identifier (SUPI) associated with the UE to determine the appropriate identity provider from multiple available options. This dual-factor selection approach ensures proper mapping between network slices, subscribers, and their corresponding identity providers while maintaining security boundaries. The backchannel session enables direct server-to-server communication between the NSSAAF and identity provider without requiring browser redirects or user agent involvement, leveraging protocols such as CIBA to establish the secure authentication channel.

At 416, the computer system provisions and configures a dedicated default network slice specifically designed to handle the authentication traffic exchanged between the UE and the selected cloud identity provider. This default slice creates an isolated communication channel that ensures secure transmission of authentication data while preventing interference with other network operations. An example default network slice 312 is shown by FIG. 3. The default slice configuration enables out-of-band authentication processes and supports multiple authentication modes including poll, ping, and push mechanisms for receiving authentication results. By segregating authentication traffic within this dedicated slice, the computer system maintains security boundaries while allowing the authentication process to proceed in parallel with other network functions, optimizing overall system performance and reliability.

At 420, the computer system initiates an out-of-band multi-factor authentication process by having the NSSAAF trigger authentication between the UE and selected cloud identity provider through the configured default network slice. This triggering can occur through multiple channels including SMS messages, push notifications, or dedicated application notifications sent to the user equipment. The out-of-band nature of the process allows the authentication to proceed without requiring direct browser interactions, instead leveraging the isolated default slice to securely transmit authentication challenges and responses. The multi-factor authentication capabilities enable modern security methods such as biometrics or one-time passwords to be used in conjunction with standard credentials, enhancing the overall security of the slice access control. This triggered process leverages the backchannel session previously established with the identity provider to coordinate the authentication flow while maintaining separation between the authentication traffic and other network operations.

At 424, the computer system receives an authentication result from the cloud identity provider through one of three supported modes: poll mode where the computer system periodically checks for results, ping mode where the system waits for notification before requesting results, or push mode where results are received directly from the provider. When authentication is successfully completed, the cloud identity provider returns an access token or success indicator to the NSSAAF via the established backchannel session. This result transmission occurs over the default network slice configured for authentication traffic, maintaining security isolation throughout the process. The authentication result provides a definitive indication of whether the UE has successfully completed the required multi-factor authentication steps with the selected identity provider.

At 428, upon successful authentication, the computer system enables access to both the network slice and its associated slice-specific services through a coordinated configuration process. The NSSAAF updates network slice access configurations to grant the UE access to the authenticated slice. This enablement extends beyond basic slice connectivity to include single sign-on access to related services such as edge computing and software-defined wide area network capabilities that are specifically associated with the slice. The computer system coordinates the activation of all necessary communication channels and service configurations while maintaining proper security boundaries and access controls. This comprehensive service enablement ensures that authenticated users can seamlessly access both the network slice resources and any additional services or features specifically configured for that slice.

Computer System

Figure 5:
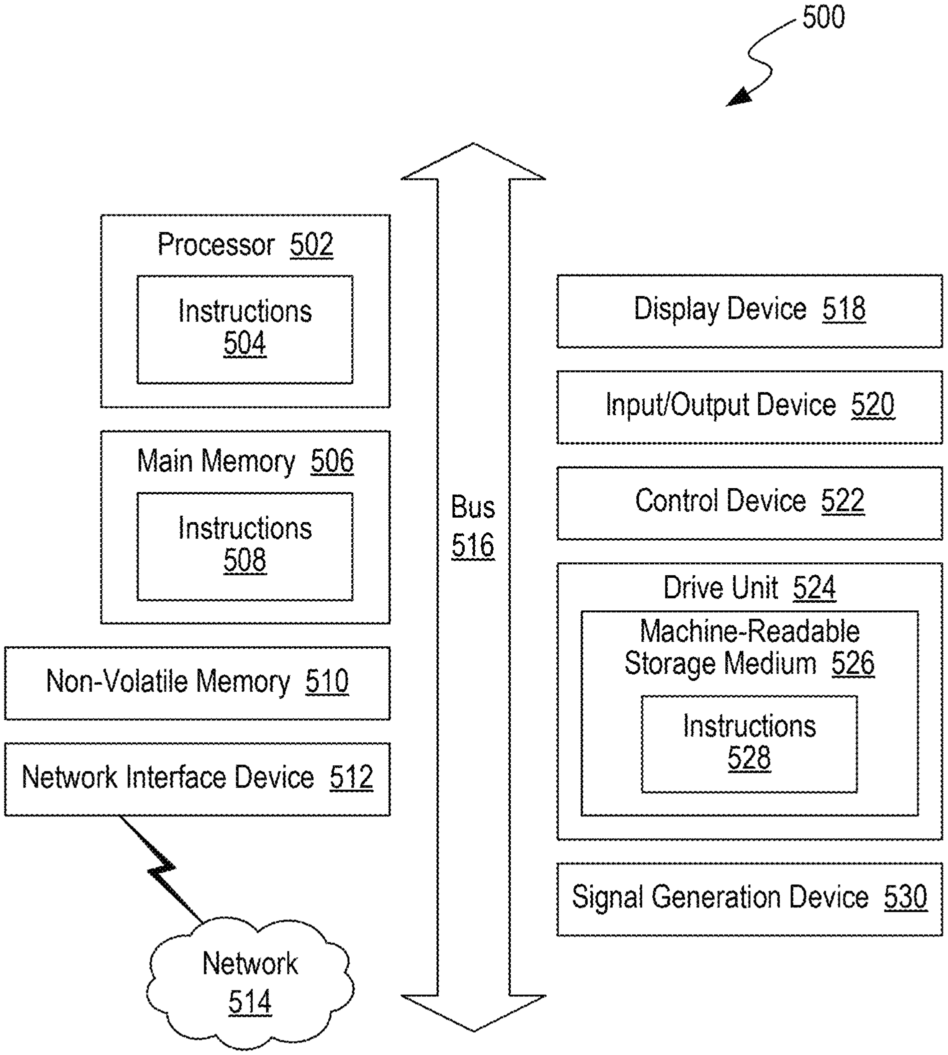
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system comprising:

at least one hardware processor; and at least one non-transitory memory storing instructions, which, when executed by the at least one hardware processor, cause the computer system to:

receive a network slice authentication request for a user equipment to access a network slice after completion of primary authentication between the user equipment and a network using subscription credentials;

determine that network slice-specific authentication is required for the network slice;

select a cloud identity provider from multiple available identity providers based on both the network slice identifier and a subscription identifier associated with the user equipment;

transmit, via a Network Slice-Specific Authentication and Authorization Function (NSSAAF), a backchannel authorization request to the selected cloud identity provider;

receive an authorization response including an authentication request identifier from the cloud identity provider;

provision a default network slice for handling authentication traffic between the user equipment and the selected cloud identity provider;

initiate an out-of-band authentication between the user equipment and the selected cloud identity provider using the default network slice;

receive, from the cloud identity provider, an access token indicating successful multi-factor authentication of the user equipment; and enable access to both the network slice and associated slice-specific services for the user equipment based on the access token.

2. The computer system of claim 1, wherein the instructions cause the computer system to:

monitor for a revocation request associated with the user equipment; and in response to receiving a revocation request, update network slice access configurations to remove access of the user equipment to the network slice.

3. The computer system of claim 1, wherein the instructions cause the computer system to:

subscribe to receive a notification of primary authentication of the user equipment prior to initiating the out-of-band authentication.

4. The computer system of claim 1, wherein initiating the out-of-band authentication comprises:

triggering the authentication using at least one of: an SMS message, a push notification, or an application notification.

5. The computer system of claim 1, wherein receiving the authorization response comprises:

receiving the response in one of three modes: a ping mode, a push mode, or a pull mode.

6. The computer system of claim 1, wherein the instructions further cause the computer system to:

enable single sign-on access to services associated with the network slice upon successful authentication.

7. The computer system of claim 1, wherein the instructions further cause the computer system to:

process a revocation request to remove access to the network slice; and update network slice access configurations based on the revocation request.

8. At least one non-transitory computer-readable storage medium storing instructions, which, when executed by at least one data processor of a computer system, cause the computer system to:

receive a notification that a user equipment has completed primary authentication using subscription credentials;

determine that network slice-specific authentication is required for a network slice requested by the user equipment;

establish a client-initiated backchannel authentication session with a cloud identity provider selected based on the network slice;

receive an authentication request identifier from the cloud identity provider;

trigger an out-of-band authentication process between the user equipment and the cloud identity provider using a default network slice configured for authentication traffic;

monitor for receipt of an authentication result from the cloud identity provider; and configure network slice access for the user equipment based on the authentication result.

9. The non-transitory computer-readable storage medium of claim 8, wherein triggering the out-of-band authentication process comprises:

sending at least one of a push notification, an SMS message, or an application notification to initiate a multi-factor authentication process on the user equipment.

10. The non-transitory computer-readable storage medium of claim 8, wherein monitoring for receipt of the authentication result comprises:

implementing one of three authentication modes including a poll mode, a ping mode, and a push mode for receiving the result from the cloud identity provider.

11. The non-transitory computer-readable storage medium of claim 8, wherein the instructions cause the computer system to:

enable single sign-on access to edge computing and software-defined wide area network services associated with the network slice upon authentication.

12. The non-transitory computer-readable storage medium of claim 8, wherein selecting the cloud identity provider is based on a single network slice selection assistance information identifier and a subscription permanent identifier associated with the user equipment.

13. The non-transitory computer-readable storage medium of claim 8, wherein the instructions cause the computer system to:

maintain a mapping between network slices and corresponding cloud identity providers; and select the cloud identity provider based on the mapping.

14. The non-transitory computer-readable storage medium of claim 8, wherein the instructions further cause the computer system to:

process an access revocation request by updating slice-specific authentication configurations; and notify the cloud identity provider to terminate authentication sessions associated with the revoked access.

15. A method performed by a computer system, comprising:

receiving, by a Network Slice-Specific Authentication and Authorization Function (NSSAAF), a notification that a user equipment has completed primary authentication with a network using subscription credentials;

determining that network slice-specific authentication is required for a network slice requested by the user equipment;

establishing a backchannel authentication session with a cloud identity provider selected based on the network slice and a subscription identifier associated with the user equipment;

configuring a default network slice to handle authentication traffic between the user equipment and the selected cloud identity provider;

triggering an out-of-band multi-factor authentication process between the user equipment and the selected cloud identity provider using the default network slice;

receiving an authentication result from the cloud identity provider indicating authentication completed; and enabling access to the network slice and associated slice-specific services.

16. The method of claim 15, comprising subscribing to receive notifications of primary authentication completions prior to receiving the notification.

17. The method of claim 15, wherein triggering the out-of-band multi-factor authentication process comprises:

transmitting at least one of: a push notification, an SMS message, or an application notification to the user equipment.

18. The method of claim 15, wherein receiving the authentication result comprises:

implementing one of: a poll mode that periodically requests the result, a ping mode that waits for a notification before requesting the result, or a push mode that receives the result directly from the cloud identity provider.

19. The method of claim 15, comprising:

maintaining a mapping between network slices and corresponding cloud identity providers;

selecting the cloud identity provider using the mapping and the network slice identifier; and validating the selection using the subscription identifier.

20. The method of claim 15, comprising:

enabling single sign-on access to edge computing services associated with the network slice upon authentication.

* * * * *